(12) United States Patent
Best

(10) Patent No.: US 10,888,475 B1
(45) Date of Patent: Jan. 12, 2021

(54) LIGHTWEIGHT PATIENT TRANSPORTER

(71) Applicant: James Best, Hollis, NH (US)

(72) Inventor: James Best, Hollis, NH (US)

(*) Notice: Subject to any disclaimer, the term of this patent is extended or adjusted under 35 U.S.C. 154(b) by 0 days.

(21) Appl. No.: 16/839,143

(22) Filed: Apr. 3, 2020

Related U.S. Application Data

(63) Continuation of application No. 16/271,931, filed on Feb. 11, 2019, now Pat. No. 10,610,428.

(60) Provisional application No. 62/631,020, filed on Feb. 15, 2018.

(51) Int. Cl.
| | |
|---|---|
| *A61G 5/04* | (2013.01) |
| *A61G 5/08* | (2006.01) |
| *A61G 5/10* | (2006.01) |
| *A61G 5/02* | (2006.01) |
| *B62D 65/02* | (2006.01) |

(52) U.S. Cl.
CPC ............. *A61G 5/0833* (2016.11); *A61G 5/02* (2013.01); *A61G 5/1059* (2013.01); *B62D 65/02* (2013.01); *A61G 5/04* (2013.01); *A61G 2200/34* (2013.01); *A61G 2200/38* (2013.01)

(58) Field of Classification Search
CPC ........................................................ B62B 3/02
See application file for complete search history.

(56) References Cited

U.S. PATENT DOCUMENTS

| | | | | |
|---|---|---|---|---|
| 7,303,537 | B1* | 12/2007 | Snyder ................. | A61F 3/00 135/68 |
| 8,931,583 | B2 | 1/2015 | Tuckowski et al. | |
| 2001/0038186 | A1* | 11/2001 | Wychozowycz ........ | A61H 3/04 280/87.021 |
| 2012/0181773 | A1 | 7/2012 | Ouboter | |
| 2014/0274565 | A1 | 9/2014 | Boyette et al. | |
| 2015/0197305 | A1 | 7/2015 | Boes | |
| 2016/0347397 | A1 | 12/2016 | Etzelsberger et al. | |

OTHER PUBLICATIONS

"A Spectacular Combination of Technology and Design. BMW's M Bike", downloaded from www.modular4kc.com.
"Bike on Behance", downloaded from www.behance.net.
Carmody, Brian, "How a Rollator Differs From a Walker", Dec. 26, 2018, downloaded from www.verywellhealth.com.
Carmody, Brian, "The Features of Different Walkers", Sep. 21, 2018, downloaded from www.verywellhealth.com.
Sandru, Ovidiu, "ENV Electric Motorcycle—Fuel Cell Powered", Feb. 2, 2008, downloaded from www.Greenoptimistic.com.
Tran, Long, "A New Way to Bike", Oct. 20, 2008, downloaded from www.yankodesign.com.

* cited by examiner

*Primary Examiner* — John D Walters
*Assistant Examiner* — James J Triggs
(74) *Attorney, Agent, or Firm* — Thomas M. Joseph, Esq

(57) ABSTRACT

A lightweight collapsible frame, a plurality of wheels, at least one supporting member for supporting a patient at least partially, and at least one guiding member for guiding the movement of the transporter is provided. At least one of the plurality of wheels is mounted on the lightweight collapsible frame and at least one of the plurality of wheels is mounted on the guiding member. The guiding member and the supporting member are mounted on the frame.

20 Claims, 7 Drawing Sheets

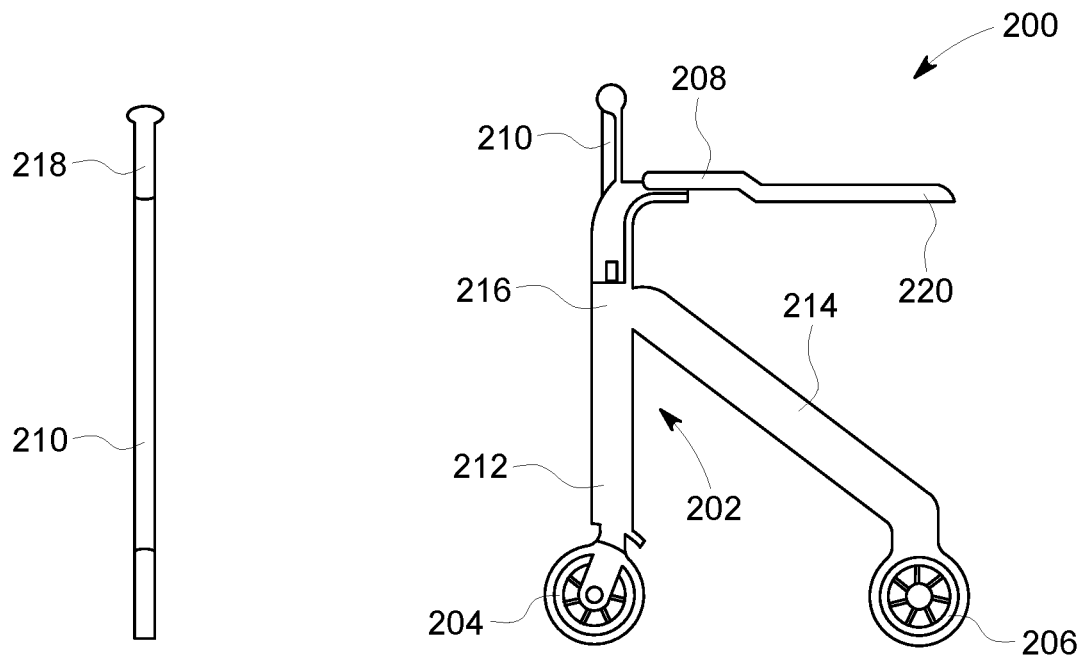
FIG. 3C
FIG. 3A
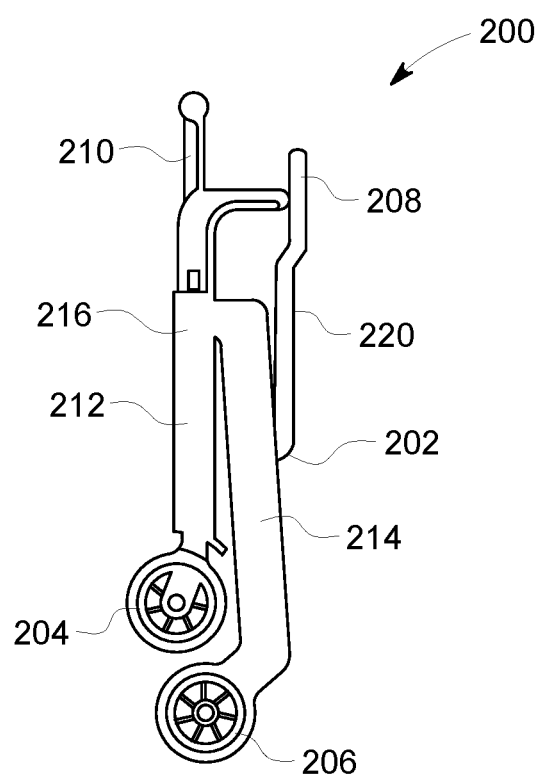
FIG. 3B

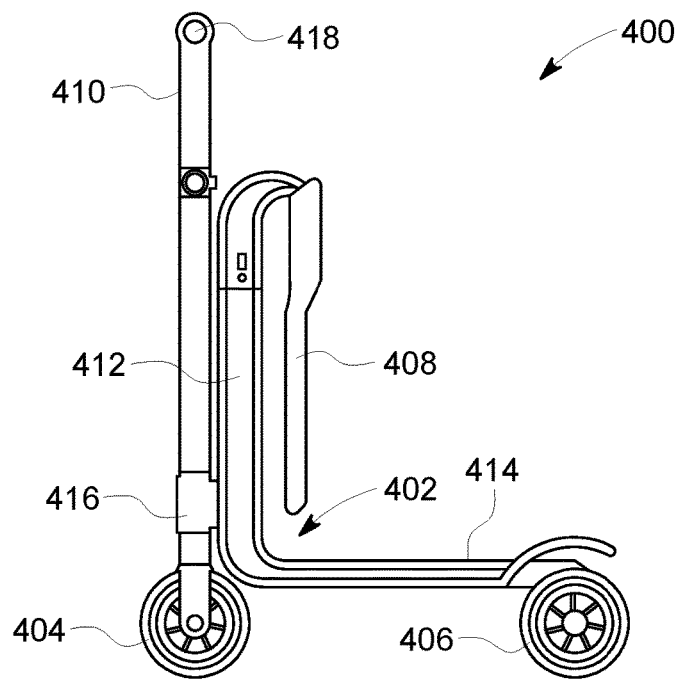
FIG. 5A
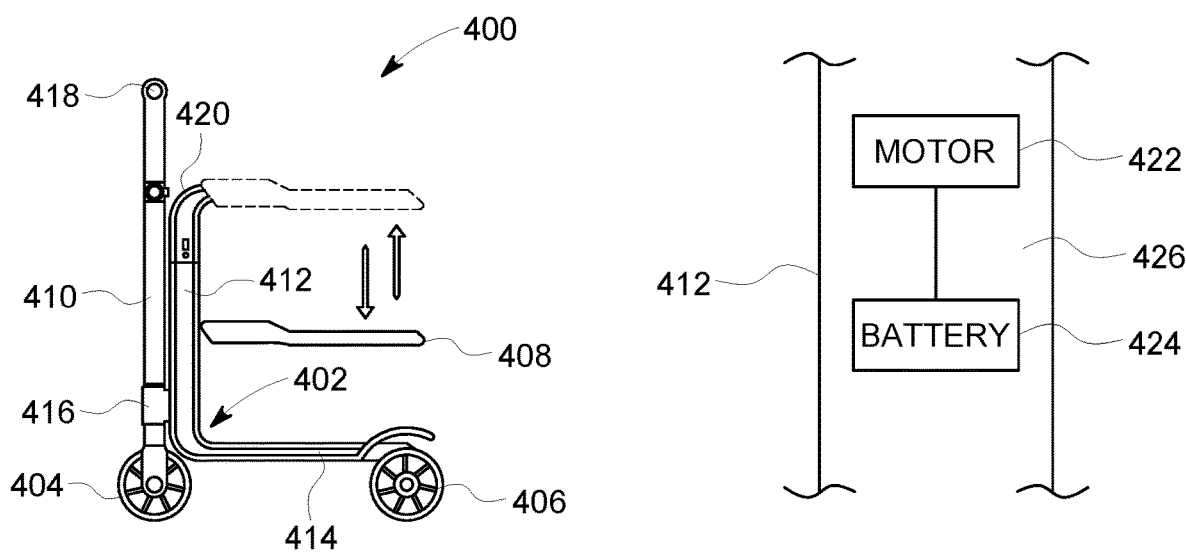
FIG. 5B
FIG. 5C

LIGHTWEIGHT PATIENT TRANSPORTER

CROSS REFERENCE TO RELATED APPLICATION

This application claims the benefit of co-pending U.S. patent application Ser. No. 16/271,931 entitled "LIGHTWEIGHT PATIENT TRANSPORTER" filed Feb. 11, 2019, which claims the benefit under 35 U.S.C. § 119(e) U.S. Provisional Application No. 62/631,020 entitled "LIGHTWEIGHT PATIENT TRANSPORTER" filed Feb. 15, 2018, which is incorporated herein by reference.

BACKGROUND

Medical patients and other similar individuals can use various devices to facilitate transportation. Walkers or walking frames represent a common form of patient transportation. Walkers, which were developed in the 1950s, usually include a lightweight frame that is about waist high, approximately 12 inches (30 cm) deep and slightly wider than the user. Walkers are also available in other sizes such as pediatric (for children) or bariatric (for obese persons). Walkers can provide additional support to maintain balance or stability while walking, but can be cumbersome.

Wheelchairs represent another device that can be used for patient transportation for a significant portion of society. Whether manual or powered, wheelchairs provide an important degree of independence for those they assist. Powered wheelchairs often have a seat coupled to a chassis. The chassis of the wheelchair may take a variety of forms.

Rollators represent another form of patient transportation that can include a frame with three or four large wheels, handlebars and a built-in seat, which allows the user to stop and rest when needed. Rollators are also often equipped with a shopping basket. Rollators are typically more sophisticated than conventional walkers with wheels.

Other examples of known personal vehicles include vehicles 10-40 shown in FIGS. 1A-1D. None of those vehicles are suitable for being a lightweight substitute for a wheelchairs, walkers, and rollators. Accordingly, there is a need for an improved personal vehicle that can be used for transporting patients.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, an improved patient transporter includes a lightweight collapsible frame, a plurality of wheels, at least one supporting member for supporting a patient at least partially, and at least one guiding member for guiding the movement of the transporter. At least one of the plurality of wheels is mounted on the lightweight collapsible frame and at least one of the plurality of wheels is mounted on the guiding member. The guiding member and the supporting member are mounted on the frame.

In other implementations, a method for assembling an improved patient transporter includes pivotally connecting a front member having a tubular portion to a rear member to form a collapsible frame. A guiding member is inserted through the front member tubular portion. A supporting member connects to the front member. A front wheel is attached to the guiding member and a rear wheel to the rear member.

These and other features and advantages will be apparent from a reading of the following detailed description and a review of the appended drawings. It is to be understood that the foregoing summary, the following detailed description and the appended drawings are explanatory only and are not restrictive of various aspects as claimed.

BRIEF DESCRIPTION OF THE DRAWINGS

FIG. 3A is a perspective view of another embodiment of a lightweight patient transporter having a K-frame in an expanded configuration.

FIG. 3B is a perspective view of the embodiment of the lightweight patient transporter shown in FIG. 3A in a collapsed configuration.

FIG. 3C is a perspective view of a member for manipulating a lightweight patient transporter.

FIG. 5A is a perspective view of another embodiment of a lightweight patient transporter having a motorized C-frame in an expanded configuration.

FIG. 5B is a perspective view of the embodiment of the lightweight patient transporter shown in FIG. 5A in a collapsed configuration.

FIG. 5C is a fragmentary side elevation view in cross section of the lightweight patient transporter shown in FIGS. 5A-5B.

DETAILED DESCRIPTION

The subject disclosure is directed to a personal vehicle within the field of durable medical goods. Specifically, the disclosure is directed to a personal vehicle that is suitable for use a lightweight patient transporter that can replace a wheelchair or other similar mobility devices in certain applications. The transporter can be manipulated by the patient or by a personal care worker.

The detailed description provided below in connection with the appended drawings is intended as a description of examples and is not intended to represent the only forms in which the present examples can be constructed or utilized.

The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

The transporter combines some of the features of a walker and a wheelchair with a configuration that is different from a typical rollator—. The frame is lightweight, collapsible, and wheeled. A supporting member can be utilized as a chair in some applications to support a patient. A removable guiding member can be inserted into a tubular member within the frame to steer the transporter. The patient can also manipulate the guiding member after it has been removed and/or disengaged from the frame.

Figure 1A:
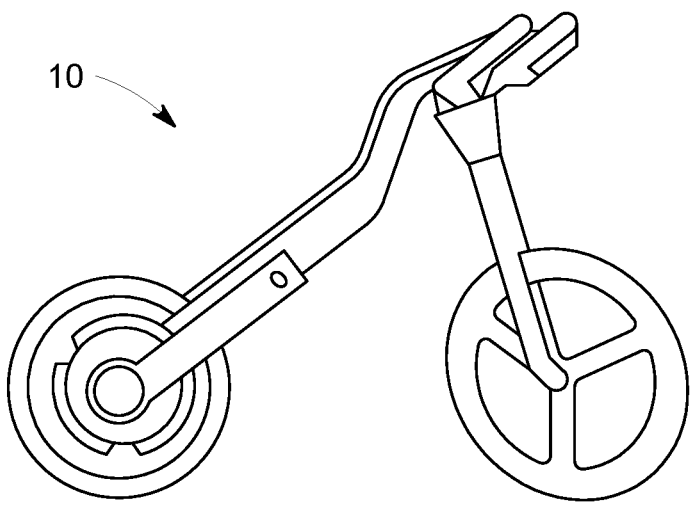
FIG. 1A is a perspective view of a conventional personal vehicle found in the prior art.
Figure 1B:
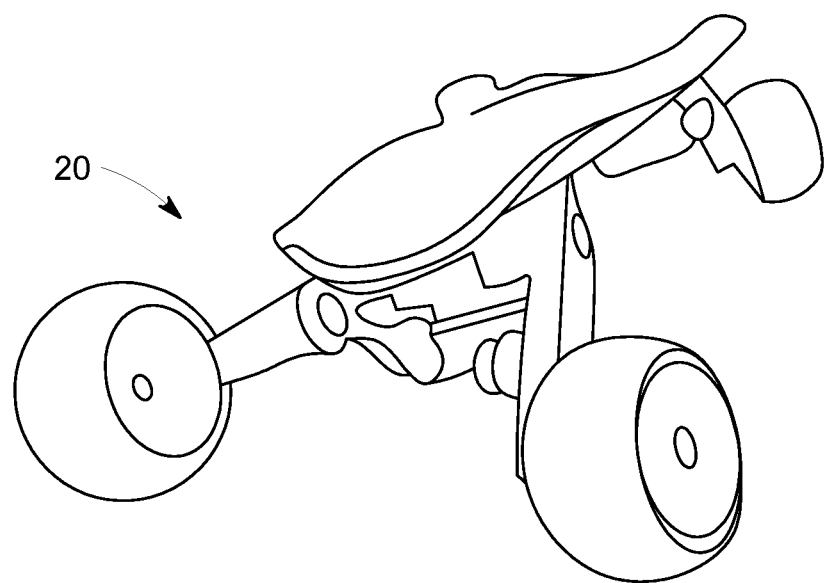
FIG. 1B is a perspective view of another embodiment of a conventional personal vehicle found in the prior art.
Figure 1C:
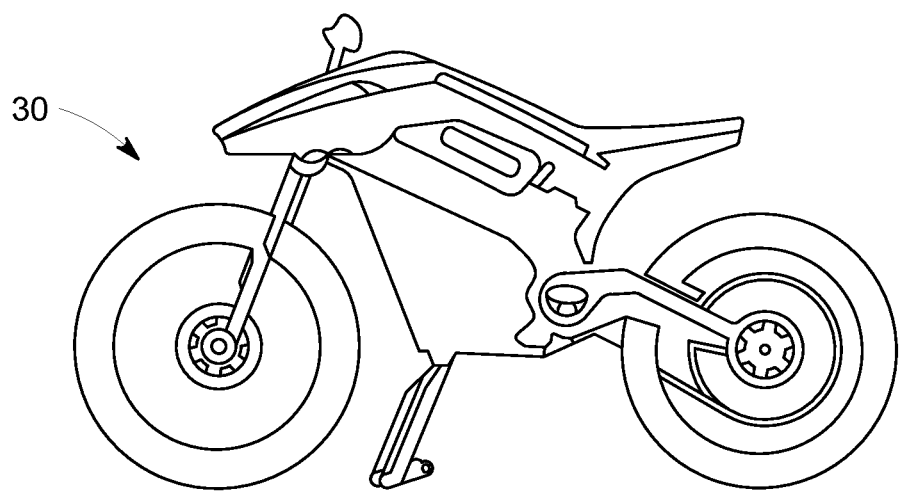
FIG. 1C is a perspective view of another embodiment of a conventional personal vehicle found in the prior art.
Figure 1D:
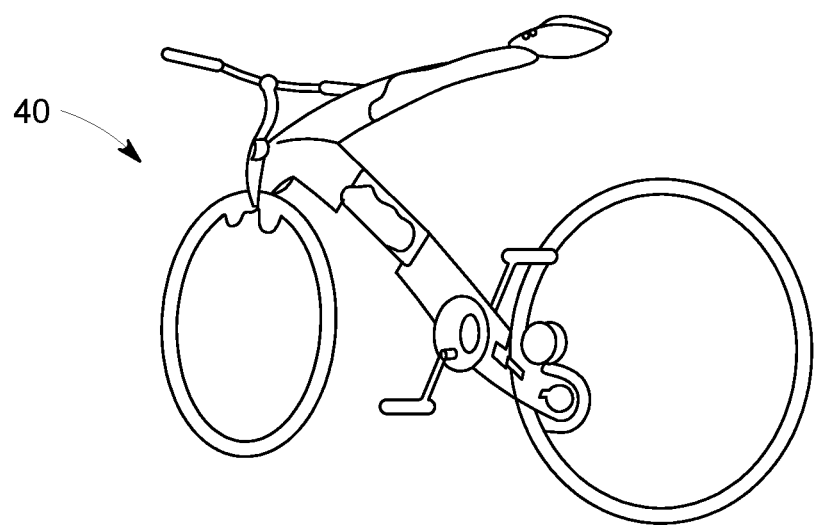
FIG. 1D is a perspective view of another embodiment of a conventional personal vehicle found in the prior art.
Figure 2A:
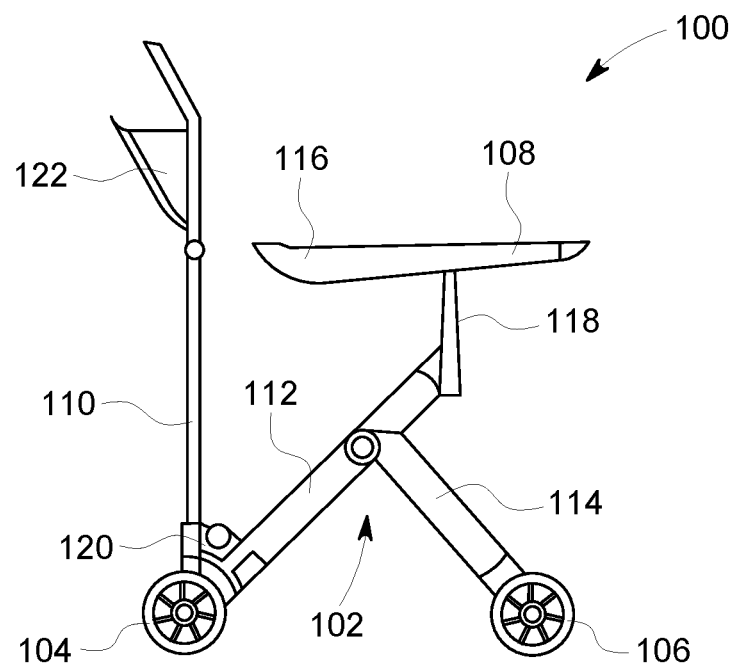
FIG. 2A is a perspective view of an embodiment of a lightweight patient transporter having an X-frame in an expanded configuration.
Figure 2B:
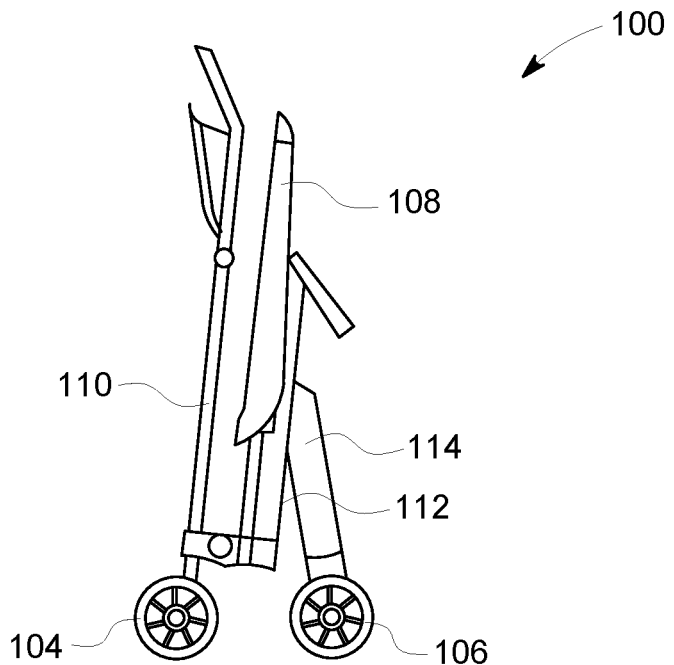
FIG. 2B is a perspective view of the embodiment of the lightweight patient transporter shown in FIG. 2A in a collapsed configuration.

Referring to FIGS. 2A-2B an improved patient transporter, generally designated by the numeral 100, is shown. The patient transporter 100 is a small mobility device for in-home care and out-home care. The patient transporter 100 can serve as a chair for transporting patients that can be manipulated by the patient or by care workers. patient transporter 100 can be used to move patients in a kneeling position or to facilitate the lifting of a patient into bed or out of bed.

The patient transporter 100 can be collapsed from the expanded configuration shown in FIG. 2A to the collapsed configuration shown in FIG. 2B to facilitate transport and/or storage in a car, for example. The patient transporter 100 can be moved to intermediate positions for maximum adjustability. The patient transporter 100 can moved manually (i.e., non-powered) or can be attached to a power source for enhanced mobility.

The patient transporter 100 includes a lightweight collapsible frame 102, a plurality of wheels 104-106, a supporting member 108, and a guiding member 110. The frame 102 includes a front member 112 and a rear member 114 pivotally attached to the front member 112. The front member 112 and the rear member 114 form an X-frame in the expanded configuration shown in FIG. 2A.

The wheel 104 is mounted for rotation on the guiding member 110. The wheel 106 is mounted for rotation on the rear member 114. The supporting member 108 includes a seat 116 and a support post 118 that attaches to the front member 112. The seat 116 can support a patient, at least partially.

The front member 112 includes a tubular portion 120 that defines an extension for receiving the guiding member 110. The guiding member 110 can be inserted into the tubular portion 120 to facilitate guiding the movement of the patient transporter 100. The guiding member 110 includes a handle 122 that can be gripped by a patient to steer the patent transporter 100.

The supporting member 108, the guiding member 110, the front member 112, and the rear member 114 can be made from any suitable material through any suitable manufacturing method. Suitable materials also include metals, ceramics, plastics, and composites. In some embodiments, suitable materials include lightweight materials or materials that have a high strength-to-weight ratio.

Referring to FIGS. 3A-3C another embodiment of an improved patient transporter, generally designated by the numeral 200, is shown. Like the embodiment shown in FIGS. 2A-2B, the patient transporter 200 can be collapsed from the expanded configuration shown in FIG. 3A to the collapsed configuration shown in FIG. 3B to facilitate transport and/or storage. The patient transporter 200 can be positioned in intermediate positions for maximum adjustability.

The patient transporter 200 includes a lightweight collapsible frame 202, a plurality of wheels 204-206, a supporting member 208, and a guiding member 210. The frame 202 includes a front member 212 and a rear member 214 pivotally attached to the front member 212. The supporting member 208 pivotally attaches to front member 212.

The front member 212 includes a tubular portion 216 for receiving the guiding member 210. The guiding member 210 includes a handle 218 that can be gripped by a patient sitting on a seat 220. The patient can use the guiding member 210 to steer the patient transporter 200. Alternatively, the patient can remove the guiding member 210 from the tubular portion 216 for use as a crutch or walking aid.

Unlike the embodiment shown in FIGS. 2A-2B, the supporting member 208, the front member 212, and the rear member 214 can be configured into K-configuration when the frame 202 is in the expanded configuration shown in FIG. 3B. The supporting member 208, the front member 212, and the rear member 214 can be locked in the K-configuration to enhance rigidity of the patient transporter 200.

Figures 4A, 4C:
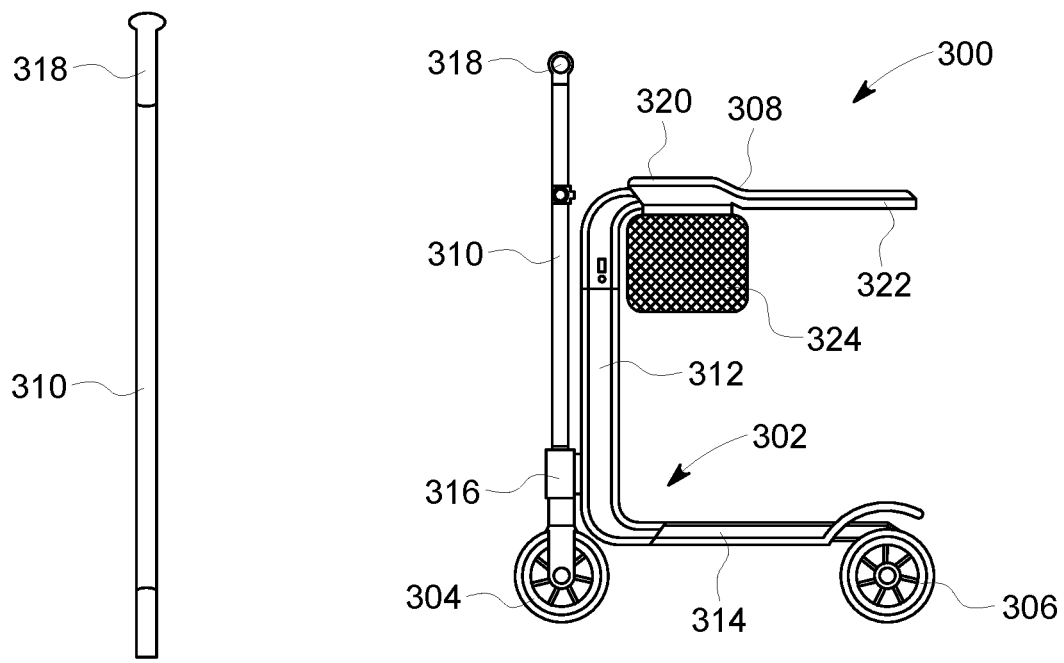
FIG. 4A is a perspective view of another embodiment of a lightweight patient transporter having a C-frame in an expanded configuration.
FIG. 4C is a perspective view of a member for manipulating a lightweight patient transporter.
Figure 4B:
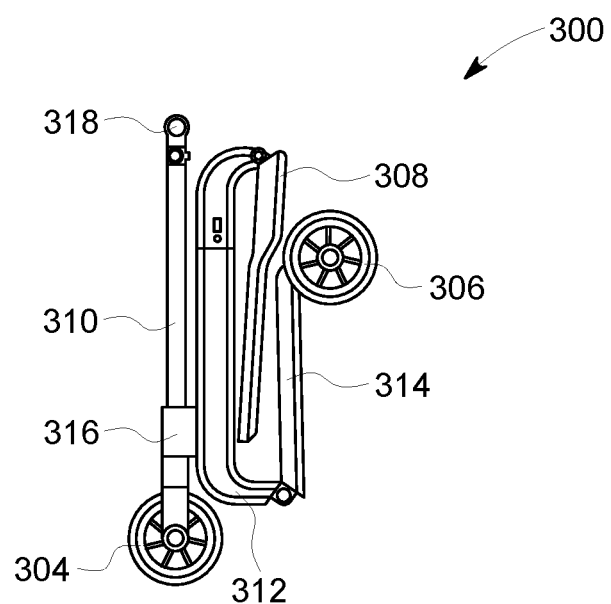
FIG. 4B is a perspective view of the embodiment of the lightweight patient transporter shown in FIG. 4A in a collapsed configuration.

Referring to FIGS. 4A-4C another embodiment of an improved patient transporter, generally designated by the numeral 300, is shown. Like the embodiment shown in FIGS. 2A-2B and FIGS. 3A-3C, the patient transporter 300 can be collapsed from the expanded configuration shown in FIG. 4A to the collapsed configuration shown in FIG. 4B to facilitate transport and/or storage.

The patient transporter 300 includes a lightweight collapsible frame 302, a plurality of wheels 304-306, a supporting member 308, and a guiding member 310. The frame 302 includes a front member 312 and a rear member 314 pivotally attached to the front member 312. The supporting member 308 pivotally attaches to front member 312. The front member 312 includes a tubular portion 316 that defines an extension for receiving the guiding member 310. The guiding member 310 includes a handle 318.

Unlike the embodiment shown in FIGS. 2A-2B and FIGS. 3A-3C, the supporting member 308, the front member 312, and the rear member 314 form a C-configuration when the patient transporter 300 is in the expanded configuration shown in FIG. 4A. The supporting member 308, the front member 312, and the rear member 314 can be locked in the C-configuration to enhance rigidity.

The supporting member 308 includes essentially flat portions 320-324 that are mounted essentially perpendicular to one another. The flat portions 320-322 can defined a seat to support a patient. The patient can sit upon the seat and manipulate the handle 318 to steer the patient transporter 300 when the supporting member 308, the front member 312, and the rear member 314 are in the C-configuration.

Referring to FIGS. 5A-5C another embodiment of an improved patient transporter, generally designated by the numeral 400, is shown. The patient transporter 400 includes a lightweight collapsible frame 402, a plurality of wheels 404-406, a supporting member 408, and a guiding member 410.

The frame 402 includes a front member 412 and a rear member 414 pivotally attached to the front member 412. The supporting member 408 pivotally attaches to front member 412. The front member 412 includes a tubular portion 416 that defines an extension for receiving the guiding member 410. The guiding member 410 includes a handle 418.

Like the embodiment shown in FIGS. 4A-4C, the supporting member 408, the front member 412, and the rear member 414 form a C-configuration when the patient transporter 400 is in the expanded configuration shown in FIG. 5A. The supporting member 408, the front member 412, and the rear member 414 can be locked in the C-configuration to enhance rigidity.

Unlike the embodiment shown in FIGS. 4A-4C, the front member 412 includes a telescoping section 420 that can be raised or lowered to raise or lower the supporting member 408. The supporting member 408 can support a patient at least partially in a sitting position, a kneeling position, or other similar positions. The supporting member 408 can raise or lower the patient.

A motor 422 and a battery 424 can be mounted within a chamber 410 in the front member 412. The motor 422 can raise or lower the telescoping section 420 to move the supporting member 408. The battery 424 powers the motor 422. In some embodiments, the motor 422 can be a hydraulic screw driven motor.

Figure 6:
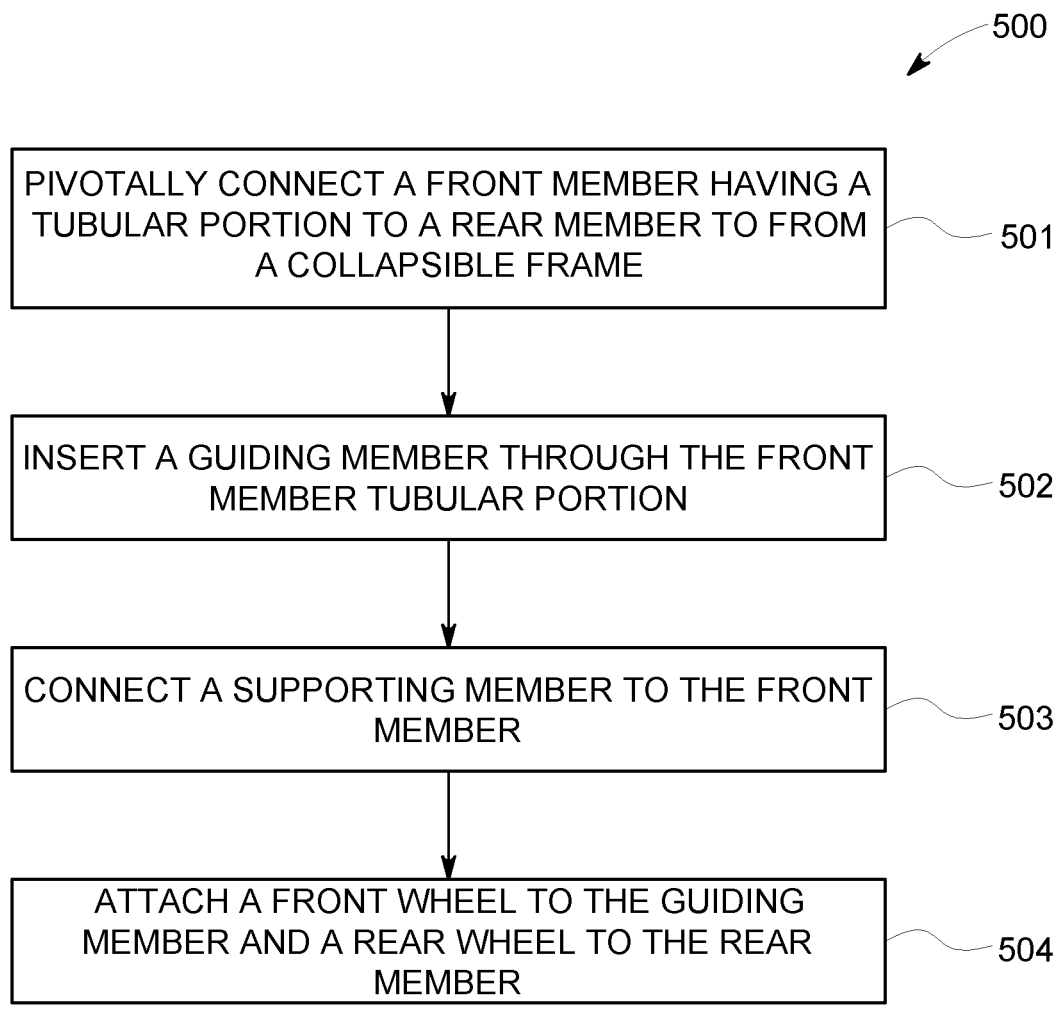
FIG. 6 illustrates an exemplary process in accordance with this disclosure.

Referring to FIG. 6 with continuing reference to the foregoing figures, a method 500 for assembling an improved patient transporter in accordance with the described subject matter is shown. Method 500, or portions thereof, can be performed to assemble the patient transporter 100 shown in FIGS. 2A-2B, the patient transporter 200 shown in FIGS. 3A-3C, the patient transporter 300 shown in FIGS. 4A-4C, and/or the patient transporter 400 shown in FIGS. 5A-5C.

At 501, a front member having a tubular portion is pivotally connected a to a rear member to form a collapsible frame. In this exemplary embodiment, the front member can be the front member 112 shown in FIGS. 2A-2B, the front member 212 shown in FIGS. 3A-3B, the front member 312 shown in FIGS. 4A-4B, and/or the front member 412 shown in FIGS. 5A-5B. The rear member can be the rear member 114 shown in FIGS. 2A-2B, the rear member 214 shown in FIGS. 3A-3B, the rear member 314 shown in FIGS. 4A-4B, and/or the rear member 415 shown in FIGS. 5A-5B. The frame can be the frame 102 shown in FIGS. 2A-2B, the frame 202 shown in FIGS. 3A-3B, the frame 302 shown in FIGS. 4A-4B, and/or the frame 402 shown in FIGS. 5A-5B.

At 502, a guiding member is inserted through the front member tubular portion. In this exemplary embodiment, the guiding member can be the guiding member 110 shown in FIGS. 2A-2B, the guiding member 210 shown in FIGS. 3A-3C, the guiding member 310 shown in FIGS. 4A-4C, and/or the guiding member 410 shown in FIGS. 5A-5B. The front member tubular portion can be the front member tubular portion 120 shown in FIGS. 2A-2B, the front member tubular portion 216 shown in FIGS. 3A-3B, the front member tubular portion 316 shown in FIGS. 4A-4B, and/or the front member tubular portion 416 shown in FIGS. 5A-5B.

At 503, a supporting member is connected to the front member. In this exemplary embodiment, the supporting member can be the supporting member 108 shown in FIGS. 2A-2B, the supporting member 208 shown in FIGS. 3A-3B, the supporting member 308 shown in FIGS. 4A-4B, and/or the supporting member 408 shown in FIGS. 5A-5B.

At 504, a front wheel is attached to the guiding member and a rear wheel to the rear member. In this exemplary embodiment, the front wheel and the rear wheel can be the wheels 104-106 shown in FIGS. 2A-2B, the wheels 204-206 shown in FIGS. 3A-3B, the wheels 304-306 shown in FIGS. 4A-4B, and/or the wheels 404-406 shown in FIGS. 5A-5B.

It should be understood that individual components of the above-described patient transporters can be made of a material that is specifically suited for the individual structural tolerances. Any combination of material or a uniform application of a single material that results in an acceptably robust structure is suitable.

Supported Features and Embodiments

The detailed description provided above in connection with the appended drawings explicitly describes and supports various features of an improved patient transporter. By way of illustration and not limitation, supported embodiments include an improved patient transporter, comprising: a lightweight collapsible frame, a plurality of wheels, at least one supporting member for supporting a patient at least partially, and at least one guiding member for guiding the movement of the transporter, wherein at least one of the plurality of wheels is mounted on the lightweight collapsible frame and at least one of the plurality of wheels is mounted on the guiding member, and wherein the guiding member and the supporting member are mounted on the frame.

Supported embodiments include the foregoing improved patient transporter, wherein the plurality of wheels include a front wheel and a rear wheel.

Supported embodiments include any of the foregoing improved patient transporters, further comprising a rear member and the rear wheel is mounted on the rear member.

Supported embodiments include any of the foregoing improved patient transporters, wherein the rear member is pivotally attached to the frame.

Supported embodiments include any of the foregoing improved patient transporters, wherein the frame includes a front member and a rear member pivotally attached to the front member.

Supported embodiments include any of the foregoing improved patient transporters, wherein the front wheel is mounted on the guiding member and the rear wheel is mounted on the frame rear member.

Supported embodiments include any of the foregoing improved patient transporters, wherein the frame front member includes a tubular portion and the guiding member is inserted into the frame front member tubular portion.

Supported embodiments include any of the foregoing improved patient transporters, wherein the frame front member includes an extension and the frame front member extension defines the front member tubular portion.

Supported embodiments include any of the foregoing improved patient transporters, wherein the frame front member and the frame rear member are arranged in an X configuration.

Supported embodiments include any of the foregoing improved patient transporters, wherein the supporting member is pivotally attached to the frame front member.

Supported embodiments include any of the foregoing improved patient transporters, wherein the frame front member, the frame rear member, and the supporting member are arranged in a C configuration.

Supported embodiments include any of the foregoing improved patient transporters, further comprising a motor and a battery for powering the motor, wherein the supporting member is movable from a lower position to an upper position and from an upper position to a lower position, and wherein the supporting member can be moved by the motor.

Supported embodiments include any of the foregoing improved patient transporters, wherein the frame front member, the frame rear member, and the supporting member are arranged in a K configuration.

Supported embodiments include any of the foregoing improved patient transporters, wherein the guiding member is releasably attached to the frame.

Supported embodiments include any of the foregoing improved patient transporters, further comprising a motor and a battery for powering the motor, wherein the supporting member is movable from a lower position to an upper position and from an upper position to a lower position, and wherein the supporting member can be moved by the motor.

Supported embodiments include any of the foregoing improved patient transporters, wherein the supporting member forms a chair.

Supported embodiments include a system, a method, an apparatus, and/or means for implementing any of the foregoing improved patient transporters or a portion thereof.

Supported embodiments include a method for assembling an improved patient transporter, the method comprising: pivotally connecting a front member having a tubular portion to a rear member to form a collapsible frame, inserting a guiding member through the front member tubular portion, connecting a supporting member to the front member, and attaching a front wheel to the guiding member and a rear wheel to the rear member.

Supported embodiments include the foregoing method, wherein the supporting member is mounted on the front member for movement from a lower position to an upper position.

Supported embodiments include any of the foregoing methods, further comprising: powering a motor to move the supporting member from the lower position to the upper position.

Supported embodiments include any of the foregoing methods, further comprising: arranging the frame front member and the frame rear member in an X configuration.

Supported embodiments include any of the foregoing methods, further comprising: arranging the frame front member, the frame rear member, and the supporting member in a C configuration.

Supported embodiments include any of the foregoing methods, further comprising: arranging the frame front member, the frame rear member, and the supporting member in a K configuration.

Supported embodiments include any of the foregoing methods, wherein the supporting member is mounted on the front member for movement from a lower position to an upper position, further comprising: powering a motor to move the supporting member from the lower position to the upper position.

Supported embodiments include a system, an apparatus, and/or means for implementing any of the foregoing methods or a portion thereof.

Supported embodiments include an improved patient transporter, consisting essentially of: a lightweight collapsible frame, a plurality of wheels, at least one supporting member for supporting a patient at least partially, and at least one guiding member for guiding the movement of the transporter, wherein at least one of the plurality of wheels is mounted on the lightweight collapsible frame and at least one of the plurality of wheels is mounted on the guiding member, and wherein the guiding member and the supporting member are mounted on the frame.

Supported embodiments can provide various attendant and/or technical advantages in terms of improved efficiency and/or savings with respect to a lightweight apparatus for moving patients. Other technical advantages can be provided through the use of a motor to raise and lower a patient supporting member.

Supported embodiments include a transporter that functions as a small mobility device for in-home and out-home care for transporting patients. The transporter can be operated by a patient or by a caregiver. The transporter can replace a wheelchair and/or a walker is some applications.

Supported embodiments include a personal transporter that can lift people from a high level. In some embodiments, the transporter or components thereof can help patients get in and out of bed.

Supported embodiments include personal transporters that can function as a scooter to assist patients who have had surgery on one or both ankles. The personal transporter can be manual or battery powered.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. An improved patient transporter, comprising:
   a lightweight collapsible frame having a front member and a rear member pivotally attached to the front member,
   a plurality of wheels mounted on the frame,
   at least one supporting member for supporting a patient at least partially, and
   at least one guiding member for guiding the movement of the transporter, wherein the front member includes a tubular portion and the guiding member is connected to the front member tubular portion, wherein the front member, the rear member, and the supporting member are arranged in a K configuration when the frame is in an expanded configuration; and wherein the rear member and the supporting member can be pivoted to move the frame into a collapsed configuration to facilitate storage.

2. The improved patient transporter of claim 1, wherein the plurality of wheels include a front wheel and a rear wheel.

3. The improved patient transporter of claim 2, wherein the front wheel is mounted on the front member.

4. The improved patient transporter of claim 2, wherein the rear wheel is mounted on the rear member.

5. The improved patient transporter of claim 1, wherein the front wheel is mounted on the front member.

6. The improved patient transporter of claim 5, wherein the front wheel is mounted on the guiding member.

7. The improved patient transporter of claim 1, wherein the supporting member is pivotally attached to the front member.

8. The improved transporter of claim 1, wherein the frame front member includes an extension and the frame front member extension defines the front member tubular portion.

9. The improved patient transporter of claim 1, wherein the front member tubular portion defines an extension for receiving the guiding member.

10. The improved patient transporter of claim 9, wherein the guiding member includes a handle.

11. The improved patient transporter of claim 1, wherein the supporting member forms a chair.

12. The improved patient transporter of claim 11, wherein the chair includes a plurality of flat portions.

13. An improved patient transporter, consisting essentially of:

a lightweight collapsible frame having a front member and a rear member pivotally attached to the front member, a plurality of wheels mounted on the frame, at least one supporting member for supporting a patient at least partially, and at least one guiding member for guiding the movement of the transporter, wherein the front member includes a tubular portion and the guiding member is connected to the front member tubular portion, wherein the front member, the rear member, and the supporting member are arranged in a K configuration when the frame is in an expanded configuration; and wherein the rear member and the supporting member can be pivoted to move the frame into a collapsed configuration to facilitate storage.

14. The improved patient transporter of claim 1, wherein the guiding member is inserted into the front member tubular portion.

15. The improved patient transporter of claim 14, wherein the guiding member includes a handle.

16. The improved patient transporter of claim 14, wherein the supporting member is adjustable.

17. The improved patient transporter of claim 14, wherein the supporting member forms a chair.

18. The improved patient transporter of claim 16, wherein the chair includes a plurality of flat portions.

19. The improved patient transporter of claim 1, wherein the guiding member is connected to the front member tubular portion.

20. The improved patient transporter of claim 1, wherein the rear member is pivotally connected to the front member tubular portion.

* * * * *